(12) United States Patent
Taverner

(10) Patent No.: US 7,113,659 B2
(45) Date of Patent: Sep. 26, 2006

(54) EFFICIENT DISTRIBUTED SENSOR FIBER

(75) Inventor: Domino Taverner, Delray Beach, FL (US)

(73) Assignee: Weatherford/Lamb, Inc., Houston, TX (US)

( * ) Notice: Subject to any disclaimer, the term of this patent is extended or adjusted under 35 U.S.C. 154(b) by 47 days.

(21) Appl. No.: 10/862,004

(22) Filed: Jun. 4, 2004

(65) Prior Publication Data

US 2005/0271317 A1    Dec. 8, 2005

(51) Int. Cl.
    *G02B 6/00* (2006.01)
(52) U.S. Cl. .................. 385/12; 385/126; 385/141; 250/227.14
(58) Field of Classification Search .............. 385/12, 385/13, 122–124, 126–129, 141, 147, 31; 250/227.14, 557, 900
See application file for complete search history.

(56) References Cited

U.S. PATENT DOCUMENTS 4,650,281 A    3/1987    Jaeger et al.
5,191,206 A *  3/1993    Boiarski et al. ....... 250/227.14
5,991,479 A * 11/1999    Kleinerman .................. 385/31
6,587,623 B1   7/2003    Papen et al.
2004/0037529 A1 2/2004  Balestra et al.

FOREIGN PATENT DOCUMENTS

JP    62293132    12/1987

OTHER PUBLICATIONS

U.K. Search Report, Application No. GB0511253.7, dated Jul. 29, 2005.

* cited by examiner

*Primary Examiner*—Phan Palmer
(74) *Attorney, Agent, or Firm*—Patterson & Sheridan, LLP

(57) ABSTRACT

A method and apparatus for improving the sensing of a physical parameter using a distributed optical waveguide and scattering. The optical waveguides have improved scattering efficiency and/or improved light capturing capability provided by multi-cladding layers and a tightly confining core waveguide. The core can be highly doped with a material such as germanium to improve scattering. The cladding layers provide a multi-mode waveguide for capturing scattered light. Such optical waveguides are useful in systems that rely on Rayleigh, Raman and Brillouin scattering.

21 Claims, 3 Drawing Sheets

EFFICIENT DISTRIBUTED SENSOR FIBER

BACKGROUND OF THE INVENTION

1. Field of the Invention

Embodiments of the present invention relate to distributed optical waveguide sensors. More specifically, embodiments of the present invention relate to distributed optical waveguide sensors having optical waveguides with multiple cladding layers.

2. Description of the Related Art

Light propagating in a medium can undergo a variety of scattering events, both linear and non-linear. Three types of light scattering are Rayleigh, Raman and Brillouin. In Rayleigh scattering, incident light is elastically scattered at the same wavelength. In Raman scattering, incident light is scattered by the vibrations of molecules or optical phonons and undergoes relatively large frequency shifts. In Brillouin scattering, incident light is scattered by acoustic vibrations (phonons) and undergoes relatively small frequency shifts.

Rayleigh, Raman, and Brillouin scattering can be used in distributed optical waveguide sensors to measure a measurand such as temperature or stress over the length of an optical waveguide. Since optical waveguides can be over 30 kilometers long, distributed optical waveguide sensors are suitable for measuring physical parameters over large distances. Distributed optical waveguide sensors that use Rayleigh, Raman, or Brillouin scattering are typically based on either Optical Time-Domain Reflectometry (OTDR) or optical frequency-domain reflectometry (OFDR). In either case, high intensity laser light is propagated in the core of an optical waveguide. Light scattering occurs within the waveguide, part of which is captured in the backward propagating modes of the waveguide and can be detected by a receiver. By monitoring one or more variations in the captured light a physical parameter can be determined.

While useful, distributed optical waveguide sensors based on scattering have problems because scattering produces signals that are much weaker than the light that created them. In optical waveguides, the originating light, referred to as pump radiation, produces a relatively small amount of scattered light, only a portion of which is captured. Because the captured light is weak, a significant integration time is required to produce measurements with suitable resolution and accuracy.

Therefore, an optical waveguide with improved scattering efficiency would be useful. An optical waveguide that enables improved capture of scattered light would also be useful.

SUMMARY OF THE INVENTION

Embodiments of the present invention generally provide for distributed optical waveguide sensors having optical waveguides with improved scattering efficiency and/or improved light capture.

Embodiments of the present invention comprise an optical waveguide having multiple cladding layers. Some embodiments have predominantly single-mode cores. Some embodiments have cores that are doped to improve scattering, e.g., highly germanium doped cores. Some embodiments include a first cladding layer and a second cladding layer.

BRIEF DESCRIPTION OF THE DRAWINGS

So that the present invention can be understood in detail, a particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides for distributed optical waveguide sensors having optical waveguides with improved scattering efficiency and/or with improved scattered light capture. A distributed optical waveguide that is in accord with the principles of the present invention has multiple cladding layers. In some embodiments a predominantly single-mode core, possibly highly germanium doped, provides improved scattering efficiency. The multiple cladding layers provide for a multiple mode optical waveguide for improved light capture. It should be understood that the principles of the present invention will boost signal levels for systems using either optical time domain reflectometry (OTDR) or optical frequency domain reflectometry (OFDR).

Figure 1:
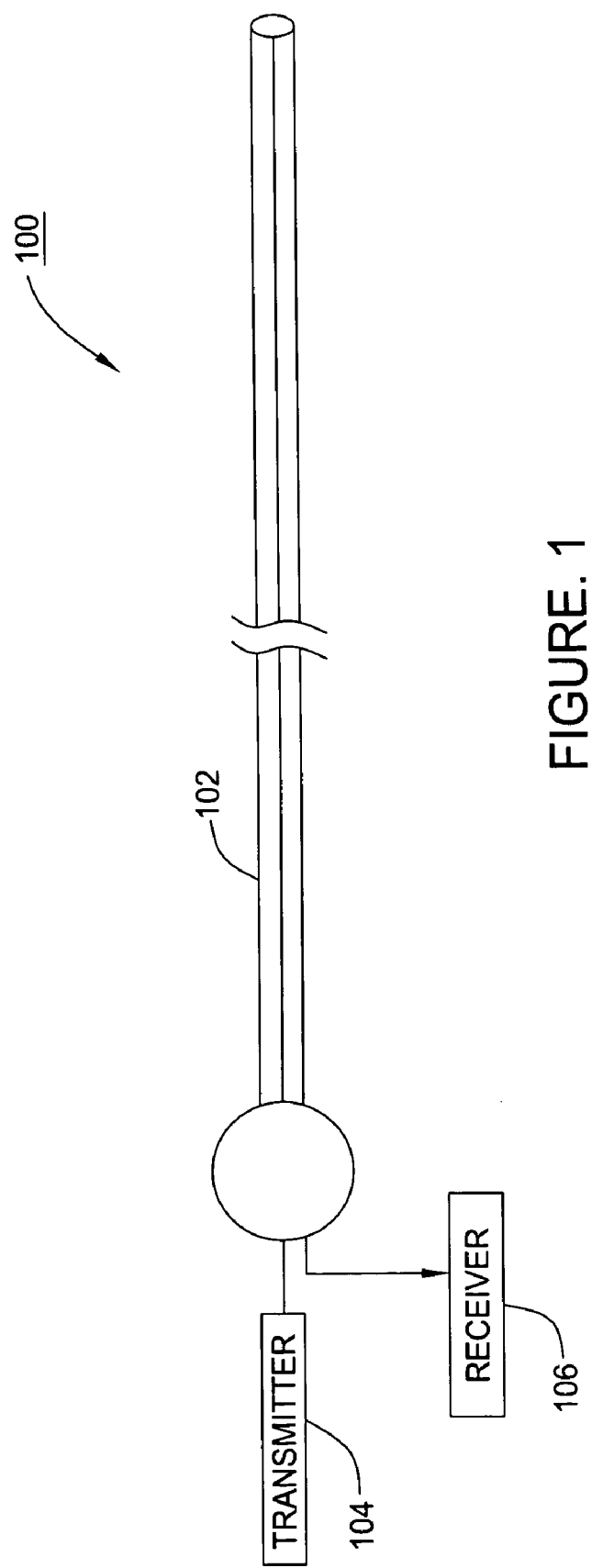
FIG. 1 is a schematic depiction of a distributed optical waveguide sensor system that is in accord with the principles of the present invention.

FIG. 1 schematically depicts a distributed optical waveguide sensor system 100 that is in accord with the principles of the present invention. As shown, the sensor system 100 includes a distributed optical waveguide 102. That optical waveguide, which includes a core and multiple cladding layers, is discussed in more detail subsequently. The sensor system 100 includes a transmitter 104 and a receiver 106 that is suitable for use with optical time domain or optical frequency domain reflectometry. It is within the scope of the present invention that receiver 106 may comprise any number of individual components necessary to produce or enhance the performance of the invention as described herein. Such components include by way of example and not by limitation, a photo detector, a data analyzer, an analogue-to-digital converter, an amplifier, and other similar devices known by those skilled in the art to assist in the reception of light and its meaningful interpretation as set forth herein. Similarly, the transmitter 104 may comprise any number of individual components necessary to produce or enhance the performance of the invention as described herein. Such components include by way of example and not by limitation, a laser, a modulator, a controller, and other similar devices known by those skilled in the art to assist in the generation and transmission of light energy as set forth herein. In addition, the transmitter 104 and receiver 106 may be in communication (optically or electrically) as necessary for their operation.

Figure 2:
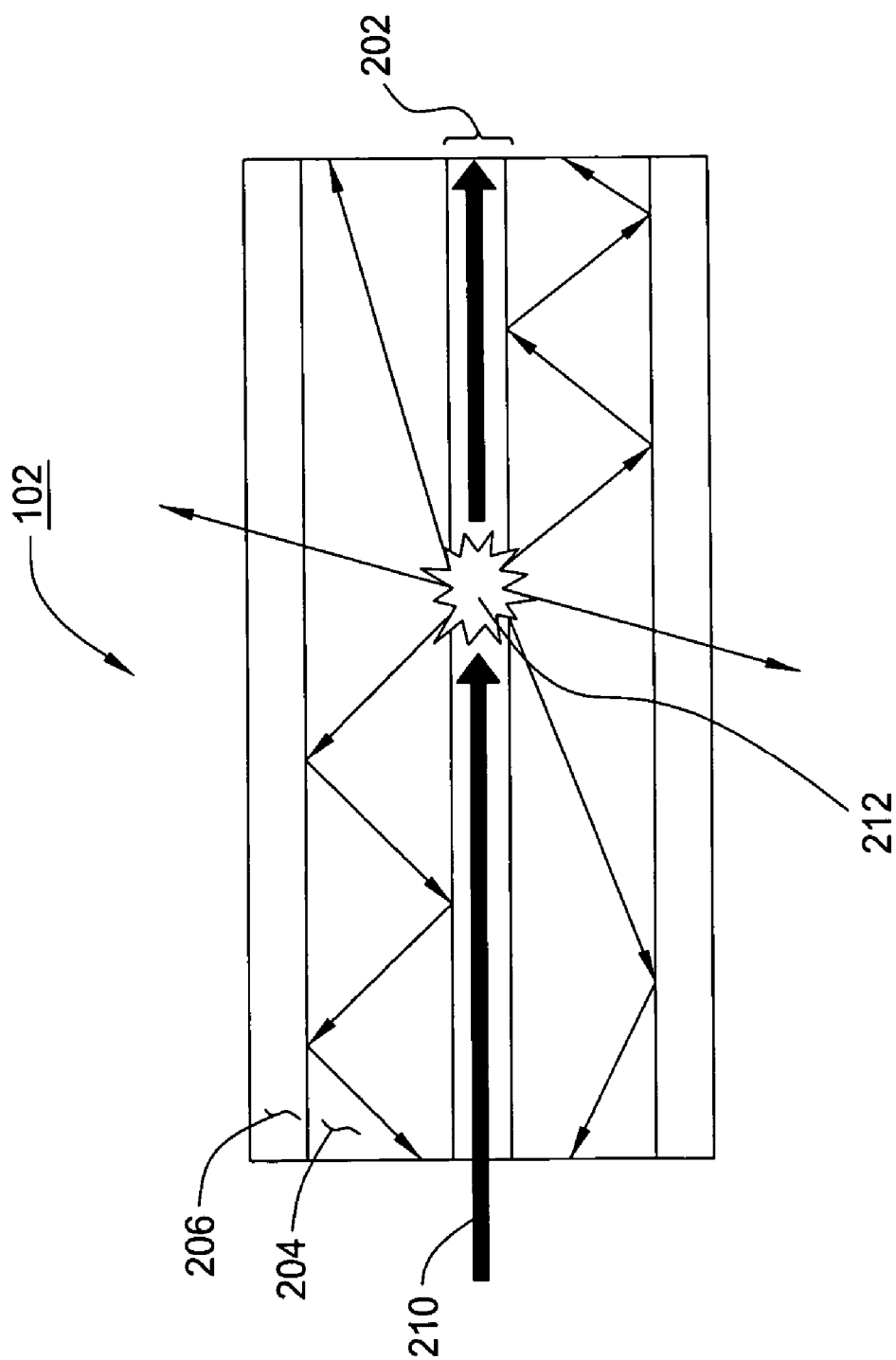
FIG. 2 schematically illustrates a section of an optical waveguide that is in accord with the principles of the present invention.

FIG. 2 schematically illustrates a section of the optical waveguide 102. It should be understood that the optical waveguide 102 can be very long, with lengths of 1–30 kilometers being fairly common. As shown, the optical waveguide 102 is comprised of a core 202, an inner cladding layer 204, and an outer cladding layer 206. The core 202 is thin, has a high index of refraction (see FIGS. 3 and 4), and often only supports a single transverse optical mode, although multiple modes may also be supported. As laser light 210 from the laser source/transmitter 104 travels down the optical waveguide 102, the laser light 210 is scattered 212 by the waveguide material. If the interaction 212 of the laser light 210 and the waveguide material produces Rayleigh scattering the incident light is elastically scattered at the same wavelength. If the interaction 212 is with an optical phonon the laser light 210 is Raman scattered with relatively large frequency shifts. If the interaction 212 is with an acoustic vibration (phonons) the laser light 210 is Brillouin scattered with relatively small frequency shifts. In any event, a portion of the scattered laser light 210 having suitable overlap with respect to the propagating modes of the waveguide formed by the core 202, the inner cladding layer 204 and the outer cladding layer 206 will be recaptured by the optical waveguide 102.

The inner cladding 204 and outer cladding 206 form a multi-mode waveguide that efficiently transports the recaptured scattered light (along with the light recaptured by the core propagating modes) to the receiver 106. That light is collected and processed to determine a physical parameter of interest using known techniques. A highly multimode waveguide having a large capture cross-section greatly improves the capture of the scattered light. While the optical waveguide 102 is shown with two cladding layers, in some applications more than two claddings may be used.

Since distributed optical waveguides 102 operate by light scattering within the core 202, it is beneficial to produce as much scattering as possible. To that end, the pump radiation 210 should be confined in a mode(s) with a small cross-section(s). This produces a high energy density, which increases the scattering efficiency of the non-linear Raman and Brillouin scattering processes. Additionally, a single, well-confined core mode will generally produce the lowest attenuation and dispersion of the propagating laser light 210. As the length of a distributed optical waveguide 102 increases a well-confined core mode is particularly useful. Core dopants and dopant concentrations, such as highly doping the core 202 with germanium, or other dopants as is known, including rare-earth dopants, can increase scattering.

Figure 3:
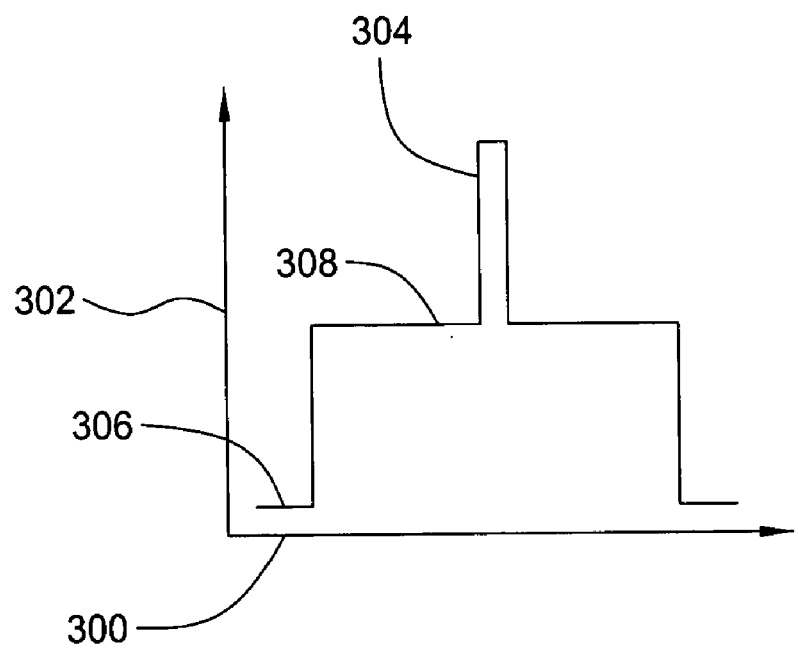
FIG. 3 illustrates the refractive indexes of a double-clad optical waveguide according to one embodiment of the present invention.
Figure 4:
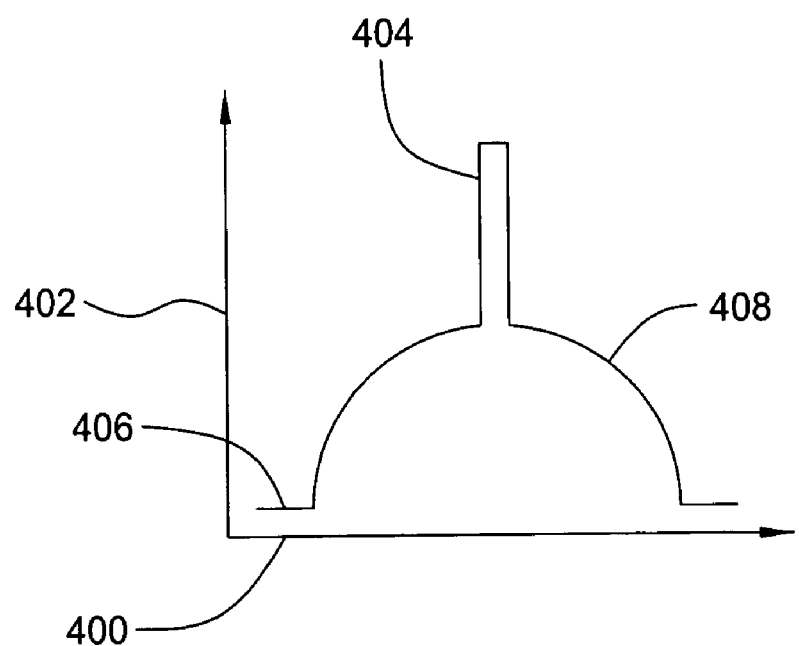
FIG. 4 illustrates the refractive indexes of a double-clad optical waveguide according to another embodiment of the present invention.

The refractive indexes of the optical waveguide 102 can be adjusted to improve performance. FIG. 3 illustrates a refractive index profile of a first embodiment optical waveguide, while FIG. 4 illustrates a refractive index profile of a second embodiment optical waveguide. In both FIGS., distance is shown on the X-axis (300 and 400) and the refractive index is shown on the Y-axis (302 and 402). The maximum refractive index is in the core 202, shown as peaks 304 and 404, while the minimum refractive indexes, shown as lines 306 and 406, are in the outer cladding layer 206. In the embodiment shown in FIG. 3, the refractive index 308 of the inner cladding layer 204 is constant. Thus, the embodiment shown in FIG. 3 uses a step index. However, in the embodiment shown in FIG. 4, the refractive index 408 of the inner cladding layer changes with radial distance. This can produce a better optical waveguide 102 in some applications.

More complex waveguide structures such as fibers with multiple rings of different refractive index or asymmetric transverse sections, waveguides of different or multiple materials (e.g. glasses, liquids, gasses), planar waveguides, so-called 'holey-fibers' or photonic crystal structures could all be designed to have the properties described in this invention. A wave-guide portion enhances nonlinear scattering through properties such as tight mode confinement, low loss and doping, and a waveguide portion that enhances capture of the scattered light through properties such as large modal overlap with the scattered light and high number of guided modes.

The core of the waveguide structure does not necessarily have to be concentric to the waveguide structure and may be positioned to optimize the recapture of scattered radiation. The waveguide structure may even consist of multiple cores, one or more of which guide the pump radiation and one or more of which recapture the scattered radiation in accordance with the principles already outlined.

While the foregoing is directed to embodiments of the present invention, other and further embodiments of the invention may be devised without departing from the basic scope thereof, and the scope thereof is determined by the claims that follow.

The invention claimed is:

1. A distributed optical waveguide sensor apparatus, comprising:
    an optical waveguide structure having a core and a cladding, wherein the core and the cladding support confinement of one or more modes within the core separate from the cladding;
    a light source for injecting injected light into and substantially confined within said core,
    wherein said cladding defines a multimode waveguide that captures within said cladding and guides along said waveguide structure scattered light scattered from the injected light;
    a receiver for converting the scattered light collected from at least said cladding into electrical signals; and
    an analyzer for determining a physical parameter of interest from said electrical signals.

2. The apparatus of claim 1, wherein the cladding includes inner and outer cladding layers, wherein said core has a higher index of refraction than said inner and outer cladding layers.

3. The apparatus of claim 2, wherein said core and said inner and outer cladding layers form a step indexed optical waveguide.

4. The apparatus of claim 2, wherein said inner cladding layer has a refractive index that progressively decreases at each location of said inner cladding layer further away with respect to distance from said core.

5. The apparatus of claim 1, wherein said core is doped to increase scattering.

6. The apparatus of claim 5, wherein said core is doped with germanium.

7. The apparatus of claim 1, wherein the core is doped with germanium.

8. The apparatus of claim 1, wherein said core defines a single optical mode waveguide.

9. The apparatus at claim 1, wherein said scattered light is Rayleigh scattered.

10. The apparatus of claim 1, wherein said scattered light is Brillouin scattered.

11. The apparatus of claim 1, wherein said scattered light is Raman scattered.

12. The apparatus of claim 1, wherein said core supports multiple optical modes.

13. The apparatus of claim 1, wherein said optical waveguide structure comprises a multiple clad fiber.

14. A method of determining a physical parameter, comprising:
- injecting injected light into a core of an optical waveguide structure;
- confining said injected light substantially within said core by a cladding layer surrounding said core;
- capturing scattered light scattered from the injected light in the cladding layer wherein the cladding layer defines a multimode waveguide;
- receiving the scattered light from at least the cladding layer;
- converting the scattered light received into electrical signals; and
- analyzing the electrical signals to determine a physical parameter of interest.

15. The method of claim 14 wherein Raman scattered light is converted.

16. The method of claim 14 wherein Rayleigh scattered light is converted.

17. The method of claim 14 wherein Brillouin scattered light is converted.

18. A method of performing optical reflectometry, comprising:
- injecting light into and substantially confined within a core of an optical waveguide due to the core supporting confinement of one or more modes separate from surrounding cladding layers;
- capturing scattered light, produced from light scattered by interactions in the core, in an inner cladding layer by using an outer cladding layer and providing the inner cladding layer that defines a multimode waveguide;
- receiving the scattered light from at least the inner cladding layer; and
- analyzing the scattered light received using reflectometry to determine a physical parameter of interest.

19. The method of claim 18, further comprising providing the core that defines a single optical mode waveguide.

20. The method of claim 18 wherein the method comprises:
- converting the scattered light received into electrical signals; and
- analyzing the electrical signals using optical time domain reflectometry.

21. The method of claim 18 wherein the method comprises:
- converting the scattered light received into electrical signals; and
- analyzing the electrical signals using optical frequency domain reflectometry.

* * * * *